United States Patent
Itkin et al.

(10) Patent No.: US 10,148,746 B2
(45) Date of Patent: Dec. 4, 2018

(54) MULTI-HOST NETWORK INTERFACE CONTROLLER WITH HOST MANAGEMENT

(71) Applicant: Mellanox Technologies Ltd., Yokneam (IL)

(72) Inventors: Yuval Itkin, Zoran (IL); Noam Bloch, Bat Shlomo (IL); Dror Goldenberg, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 618 days.

(21) Appl. No.: 14/583,124

(22) Filed: Dec. 25, 2014

(65) Prior Publication Data

US 2015/0215343 A1    Jul. 30, 2015

Related U.S. Application Data

(60) Provisional application No. 61/932,302, filed on Jan. 28, 2014.

(51) Int. Cl.
*G06F 15/16* (2006.01)
*H04L 29/08* (2006.01)
*H04L 12/24* (2006.01)

(52) U.S. Cl.
CPC ............ *H04L 67/104* (2013.01); *H04L 41/04* (2013.01)

(58) Field of Classification Search
USPC .......................... 709/217, 220, 221, 223, 201
See application file for complete search history.

(56) References Cited

U.S. PATENT DOCUMENTS

| | | |
|---|---|---|
| 5,805,816 A | 9/1998 | Picazo et al. |
| 6,198,752 B1 | 3/2001 | Lee |
| 6,289,388 B1 | 9/2001 | Disney et al. |
| 6,393,483 B1 | 5/2002 | Latif et al. |
| 7,046,668 B2 | 5/2006 | Pettey et al. |
| 7,103,064 B2 | 11/2006 | Pettey et al. |
| 7,245,627 B2 | 7/2007 | Goldenberg |
| 7,447,778 B2 | 11/2008 | Matters et al. |
| 7,457,906 B2 | 11/2008 | Pettey et al. |
| 7,464,174 B1 | 12/2008 | Ngai |
| 7,493,416 B2 | 2/2009 | Pettey |
| 7,502,370 B2 | 3/2009 | Pettey |
| 7,512,717 B2 | 3/2009 | Pettey |
| 7,519,167 B2 | 4/2009 | Jreij et al. |

(Continued)

FOREIGN PATENT DOCUMENTS

CN    103546586 A    1/2014

OTHER PUBLICATIONS

U.S. Appl. No. 14/547,160 Office Action dated Jul. 28, 2016.
(Continued)

*Primary Examiner* — Tammy Nguyen
(74) *Attorney, Agent, or Firm* — D.Kligler IP Services Ltd.

(57) ABSTRACT

A network adapter includes one or more ports and circuitry. The ports are configured to connect to a switch in a communication network. The circuitry is coupled to a network node that includes multiple hosts, and is configured to exchange management packets between a control server and multiple BMC units associated respectively with the multiple hosts, and to exchange, over the communication network via the one or more ports, data packets between the hosts and one or more remote nodes.

25 Claims, 3 Drawing Sheets

(56) References Cited

U.S. PATENT DOCUMENTS

| | | | |
|---|---|---|---|
| 7,600,112 | B2 | 10/2009 | Khatri et al. |
| 7,617,333 | B2 | 11/2009 | Pettey |
| 7,620,057 | B1 | 11/2009 | Aloni et al. |
| 7,620,064 | B2 | 11/2009 | Pettey et al. |
| 7,620,066 | B2 | 11/2009 | Pettey et al. |
| 7,664,909 | B2 | 2/2010 | Pettey |
| 7,668,941 | B1 | 2/2010 | Kathandapani |
| 7,688,838 | B1 | 3/2010 | Aloni et al. |
| 7,705,850 | B1 | 4/2010 | Tsu |
| 7,706,372 | B2 | 4/2010 | Pettey et al. |
| 7,782,893 | B2 | 8/2010 | Pettey et al. |
| 7,925,795 | B2 | 4/2011 | Tamir et al. |
| 8,032,659 | B2 | 10/2011 | Pettey |
| 8,228,848 | B2 | 7/2012 | Vos et al. |
| 8,346,884 | B2 | 1/2013 | Pettey |
| 8,400,917 | B2 | 3/2013 | Tripathi et al. |
| 8,503,468 | B2 | 8/2013 | Akyol et al. |
| 8,913,615 | B2 | 12/2014 | Pettey |
| 9,197,490 | B2 | 11/2015 | Dharmadhikari |
| 2003/0130969 | A1 | 7/2003 | Hawkins et al. |
| 2007/0002826 | A1 | 1/2007 | Bennett et al. |
| 2007/0233455 | A1 | 10/2007 | Zimmer et al. |
| 2008/0043769 | A1 | 2/2008 | Hirai |
| 2008/0080512 | A1 | 4/2008 | Gofman et al. |
| 2008/0086580 | A1 | 4/2008 | Zhang et al. |
| 2008/0183882 | A1 | 7/2008 | Flynn et al. |
| 2009/0100194 | A1 | 4/2009 | Bhadri et al. |
| 2009/0182799 | A1* | 7/2009 | Huang ............... H04L 41/00 709/201 |
| 2009/0232136 | A1 | 9/2009 | Rodriguez et al. |
| 2011/0040917 | A1 | 2/2011 | Lambert et al. |
| 2011/0078299 | A1* | 3/2011 | Nagapudi ............ H04L 12/12 709/223 |
| 2012/0023252 | A1 | 1/2012 | Helmke |
| 2012/0218905 | A1 | 8/2012 | Pettey |
| 2012/0221705 | A1 | 8/2012 | Pettey |
| 2012/0258689 | A1 | 10/2012 | Pettey |
| 2013/0145072 | A1 | 6/2013 | Venkataraghavah et al. |
| 2013/0185402 | A1* | 7/2013 | Ayanam ........... H04L 41/0813 709/221 |
| 2013/0289926 | A1 | 10/2013 | Maity et al. |
| 2013/0304903 | A1 | 11/2013 | Mick et al. |
| 2014/0059225 | A1 | 2/2014 | Gasparakis et al. |
| 2014/0059266 | A1 | 2/2014 | Ben-Michael et al. |
| 2014/0129741 | A1 | 5/2014 | Shahar et al. |
| 2014/0195657 | A1 | 7/2014 | Bhatia et al. |
| 2014/0195669 | A1 | 7/2014 | Bhatia et al. |
| 2014/0195704 | A1 | 7/2014 | Bhatia et al. |
| 2014/0229758 | A1 | 8/2014 | Richardson et al. |
| 2014/0280837 | A1 | 9/2014 | Ayanam et al. |
| 2014/0280947 | A1 | 9/2014 | Christopher et al. |
| 2014/0344431 | A1* | 11/2014 | Hsu ..................... H04L 41/044 709/223 |

OTHER PUBLICATIONS

U.S. Appl. No. 14/547,160 Office Action dated Jan. 3, 2017.
U.S. Appl. No. 14/628,256 Office Action dated Dec. 1, 2016.
DMTF Standard, "Management Component Transport Protocol (MCTP) SMBus/I2C Transport Binding Specification", Document No. DSP0237, version 1.1.0, 42 pages, Jul. 28, 2009.
DMTF Standard, "Management Component Transport Protocol 5 (MCTP) PCIe VDM Transport Binding 6 Specification", Document No. DSP0238, Version 1.1.2, 19 pages, Dec. 7, 2014.
Patrick, M.,"DHCP Relay Agent Information Option", IETF Network Working Group, RFC 3046, 14 pages, Jan. 2001.
Miles et al., "Lightweight DHCPv6 Relay Agent", IETF, RFC 6221, 18 pages, May 2001.
U.S. Appl. No. 13/467,161 Office Action dated Feb. 5, 2015.
DMTF Standard, "Management Component Transport Protocol (MCTP) Base Specification", Document No. DSP0236,version 1.2. 0, 87 pages, Jan. 24, 2013.
DMTF Standard, "Network Controller Sideband Interface (NC-SI) Specification",Document No. 10 DSP0222, version 1.0.1, 124 pages, Jan. 24, 2013.
DMTF Standard, "NC-SI over MCTP Binding Specification," Document No. DSP0261, version 1.0.0, 31 pages, Aug. 22, 2013.
SBS Implementers Forum, "System Management Bus (SMBus) Specification",version 2.0 , 59 pages, Aug. 3, 2000.
Intel Corporation, "Preboot Execution Environment (PXE) Specification",version 2.1, 103 pages, Sep. 20, 1999.
AMD, "Magic Packet Technology," publication No. 20213, revision A, Amendment/0, 6 pages, Nov. 1995.
Intel et al., "IPMI—Intelligent Platform Management Interface Specification, second generation", version 2.0, revision 1.1 , 644 pages, Oct. 1, 2013.
Linux Bonding Driver Documentation, 43 pages, Apr. 27, 2011.
IEEE Standard 802.1AX "IEEE Computer Society Standard for Local and metropolitan area networks—Link Aggregation", 163 pages, Nov. 3, 2008.
Itkin et al, U.S. Appl. No. 14/547,160, filed Nov. 19, 2014.
PCT Express Base Specification, Revision 3.0, 860 pages, Nov. 10, 2010.
Budruk et al., PCI Express System Architecture, 222 pages, Apr. 2008.
PCT Express to PCI/PCI-X Bridge Specification, Revision 1.0., 176 pages, Jul. 14, 2003.
U.S. Appl. No. 14/547,160 Office Action dated Oct. 6, 2017.

* cited by examiner

MULTI-HOST NETWORK INTERFACE CONTROLLER WITH HOST MANAGEMENT

CROSS-REFERENCE TO RELATED APPLICATIONS

This application claims the benefit of U.S. Provisional Patent Application 61/932,302, filed Jan. 28, 2014, whose disclosure is incorporated herein by reference.

FIELD OF THE INVENTION

Embodiments described herein relate generally to communication networks, and particularly to methods and systems for remote host management.

BACKGROUND OF THE INVENTION

In various computing systems, computing nodes are equipped with a dedicated management controller that communicates with a control server over the network for the purpose of remote monitoring and control. For example, U.S. Patent Application Publication 2008/0086580, whose disclosure is incorporated herein by reference, describes a system and method for managing a baseboard management controller (BMC). The system comprises at least one BMC, at least one primary node board connecting to the at least one BMC via a bus, wherein the bus is a differential bus, and the at least one BMC and the at least one primary node board connect to the differential bus in bus topology, respectively.

As another example, U.S. Patent Application Publication 2014/0195704, whose disclosure is incorporated herein by reference, describes certain aspects that are directed to a baseboard management controller (BMC). The BMC includes a processor and a memory having firmware. The firmware includes a master management instance and a plurality of assisting management instances. When the firmware is executed at the processor, the master management instance is configured to manage a chassis of a computer system, and each of the assisting management instances is configured to manage at least one health or performance related aspect a respective different computer node of a plurality of computer nodes of the computer system.

As yet another example, U.S. Patent Application Publication 2014/0344431, whose disclosure is incorporated herein by reference, describes a baseboard management system suitable for use in a high-density server system. The baseboard management system comprises a plurality of baseboard management controller (BMC) nodes, respectively located on the servers, and a main BMC coupled to a network and to the BMC nodes through a communication link for executing management software. Each BMC node is connected with a corresponding host processor and with server board peripherals individually on a corresponding server. The main BMC in cooperation with the BMC nodes is used to manage the servers remotely.

SUMMARY OF THE INVENTION

An embodiment that is described herein provides a network adapter that includes one or more ports and circuitry. The ports are configured to connect to a switch in a communication network. The circuitry is coupled to a network node that includes multiple hosts, and is configured to exchange management packets between a control server and multiple BMC units associated respectively with the multiple hosts, and to exchange, over the communication network via the one or more ports, data packets between the hosts and one or more remote nodes.

In an embodiment, the control server is external to the network node, and the circuitry is configured to exchange the management packets over the communication network via the one or more ports. In another embodiment, the control server is implemented in a first host in the network node, and the circuitry is configured to exchange the management packets between the control server and a second host of the network node directly, and not over the communication network.

In some embodiments, the circuitry is configured to exchange the management packets with a given BMC unit over a dedicated sideband channel. In other embodiments, the sideband channel includes two or more channel types, and the circuitry is configured to select one of the channel types during exchanging of the management packets. In yet other embodiments, a given BMC unit, which is associated with a respective host, is embedded in a processor of the respective host, and the circuitry is configured to exchange the management packets both with the given BMC unit and with one or more BMC units other than the given BMC unit.

In an embodiment, the circuitry is configured to exchange, over a dedicated sideband channel, at least part of the management packets with a common BMC unit that handles common resources of the network node. In another embodiment, the circuitry is configured to exchange the management packets with the BMC units by configuring a distribution switch to handle dedicated sideband channels for the respective BMC units, and exchanging the management packets indirectly via the distribution switch. In yet another embodiment, the circuitry is configured to exchange the management packets over a shared sideband channel.

In some embodiments, the shared sideband channel includes multiple sideband connections, each including a respective different connection address to which the respective BMC unit connects. In other embodiments, the shared sideband channel includes a single sideband connection supporting multiple connection addresses for connecting to the respective BMC units. In yet other embodiments, one or more of the multiple BMC units include respective BMC instances that are executed by a common BMC unit, and the circuitry is configured to exchange the management packets with the BMC instances of the common BMC unit.

There is additionally provided, in accordance with an embodiment that is described herein, a method for remote management, including communicating, in a network node that includes multiple hosts and a Network Interface Controller (NIC), exchanging using the NIC management packets between a control server and multiple BMC units associated respectively with the multiple hosts. Using the NIC, data packets are exchanged between the hosts and one or more remote nodes over a communication network.

There is additionally provided, in accordance with an embodiment that is described herein, a network node including multiple hosts and a network adapter. The network adapter is configured to exchange management packets between a control server and multiple BMC units associated respectively with the multiple hosts, and to exchange, over the communication network, data packets between the hosts and one or more remote nodes.

The present invention will be more fully understood from the following detailed description of the embodiments thereof, taken together with the drawings in which:

DETAILED DESCRIPTION OF EMBODIMENTS

Overview

Figure 1:
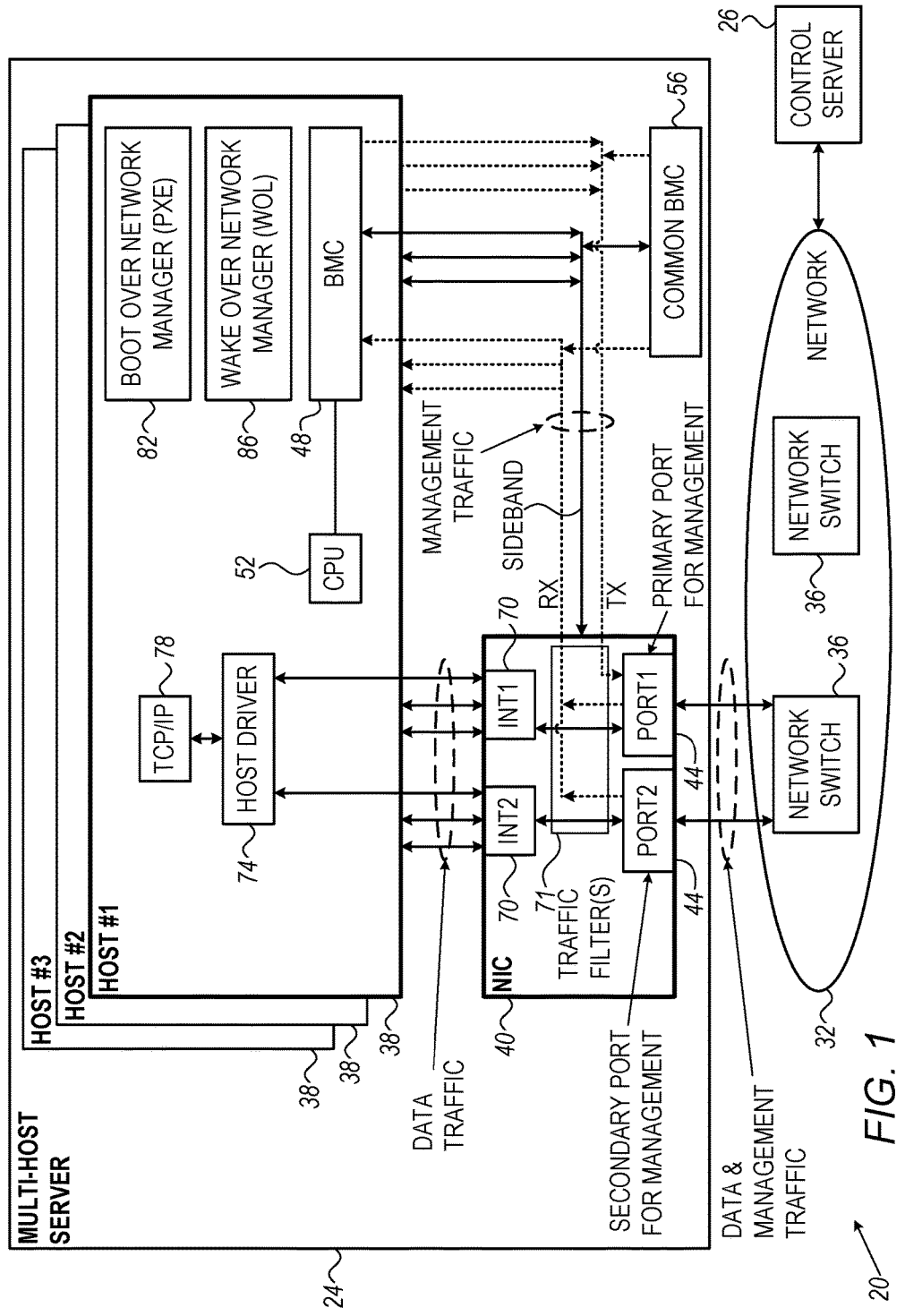
FIG. 1 is a block diagram that schematically illustrates a computer system, including a remotely managed multi-host server, in accordance with an embodiment that is described herein.

Embodiments that are described herein provide methods and systems for remote monitoring and control of a multi-host server. In some embodiments, a server that is connected to a communication network may be equipped with means that enable remote monitoring and control.

In some embodiments, a multi-host server comprises multiple hosts, each associated with a respective Baseboard Management Controller (BMC) unit, and the hosts and BMC units connect to the network using a common Network Interface Controller (NIC). In some embodiments, a given BMC unit connects to the NIC via a sideband channel, and accesses the communication network via the NIC. In a typical implementation, the host and BMC unit use separate types of traffic. Traffic (e.g., packets) communicated with the server or host is referred to herein as "data traffic," whereas traffic communicated with the BMC unit is referred to herein as "management traffic."

Allowing multiple hosts to share a common NIC requires allowing a plurality of management control channels, such as enabling remote control and management for each of the multiple hosts separately. The plurality of sideband control channels may use dedicated hardware sideband channels, share a common sideband channel, or both.

Each of the managed hosts is controlled separately and may use a dedicated BMC or share a common BMC with other hosts. In some embodiments, instead of a BMC unit that is separate from the host CPU, the host CPU comprises an embedded management controller, which is also referred to as a Management Engine (ME).

In some embodiments, a remote control server communicates with the multi-host server to access the BMC units via the common NIC. The remote server typically does not distinguish between a host in a multi-host server sharing a common NIC with other hosts, and a host with a dedicated NIC, thus allowing transparent integration of single-host servers with multi-host servers into the same cluster of compute servers.

As will be described below, special functionality is integrated into a common NIC to allow multi-host sideband-channel management.

In some embodiments, the common NIC (also referred to as network adapter) emulates a single adapter interface toward the BMC unit of each of the hosts. The network adapter separately filters data and management traffic packets received for each of the hosts and BMC units. The network adapter forwards data packets to the addressed host and management packets to the addressed BMC unit. In the opposite direction, the network adapter delivers management traffic sent by any of the BMC units and data packets sent by any of the hosts to the network.

In some embodiments, the network adapter supports multiple types of sideband channels, and can choose to communicate with a given BMC unit over one of various sideband channels. For example, when the host corresponding to a given BMC unit is in a standby or low power state, the network adapter may communicate with the BMC unit over SMBus, and when the corresponding host is fully operable the network adapter may switch to a faster connection such as a PCIe bus.

In an embodiment, the network adapter additionally provides a chassis management remote control channel. The additional management channel allows for separate chassis control, allowing separating the management of the common hardware resources of the multi-host server from the per-host dedicated resources.

In some embodiments, instead of connecting to multiple BMC units, the network adapter connects to a single common BMC unit that emulates the multiple BMC units of the hosts. The common BMC unit executes multiple BMC instances, each corresponding to a respective host. The common BMC unit may additionally execute chassis management tasks.

The disclosed techniques enable remote control of a multi-host server equipped with multiple BMC units, over sideband channels, while simultaneously communicating data traffic over the same network links. Without the disclosed techniques, such simultaneous operation would not be possible. Chassis management control traffic is also provided.

System Description

FIG. 1 is a block diagram that schematically illustrates a computer system 20, including a remotely managed multi-host server 24, in accordance with an embodiment that is described herein. System 20 can be used in various applications, such as in server farms, campus or industrial computation systems, storage systems, data center systems and the like.

System 20 typically comprises multiple network nodes such as server 24 (the figure depicts only one node, for clarity) that can each be remotely controlled by a control server 26. In the description that follows, the terms "server" and "network node" (or simply node for brevity) are used interchangeably. Node 24 and control server 26 communicate with one another over a communication network 32. In the example of FIG. 1, network 32 comprises multiple network switches 36 that deliver the communicated data among the network nodes, and between the control server and the nodes. In alternative embodiments, instead of or in addition to switches 36, any other suitable switching and/or routing network components can be used also.

System 20 may use any suitable type of communication network and related protocols. For example, the network may comprise a local or a wide area network (WAN/LAN), a wireless network, or a combination of such networks. Additionally, the network may be a packet network such as IP (e.g., with TCP as the transport protocol), Infiniband, or Ethernet network, delivering information at any suitable data rate.

Server 24 comprises multiple hosts 38 and a Network Interface Controller (NIC) 40, which is also referred to as a network adapter. In the example of FIG. 1, network adapter 40 comprises two ports 44, denoted PORT1 and PORT2. In alternative embodiments, network adapter 40 may comprise any other suitable number of ports. Ports 44 serve as a physical and electrical interface to network adapter 40.

Each host 38 comprises at least one CPU 52 that carries out the various tasks of host 38. Host 38 further comprises a Baseboard Management Controller (BMC) unit 48, which supports remote monitoring and control of respective host 38. In some embodiments, in addition to BMC units 48 in respective hosts 38, server 24 comprises a common BMC unit 56, which enables control server 26 to monitor and control common or shared node status and resources separately from the other BMCs. In the description that follows the BMC unit and common BMC unit are also referred to respectively as simply BMC and common BMC, for brevity. Common BMC 56 is also referred to herein as a chassis manager BMC. Alternatively or additionally, common BMC 56 can execute multiple BMC instances (i.e., emulating the BMC units) that are respectively associated with one or more hosts 38.

Control server 26 typically executes a dedicated management and control program. The control program may control one or more hosts 38 in server 24 that are equipped with a baseboard management unit such as BMC 48, common BMC 56 or both. Control server 26 may control multiple network nodes, as well as multiple hosts that belong to the same or different network nodes, which are accessible via network 32. The program may execute control and monitor operations automatically, or triggered by a human user via a suitable user interface (not shown).

In the embodiments described above, control server 26 typically comprises a separate server that controls a multi-host server 24 or hosts 38 thereof over network 32. In these embodiments, management traffic between the control server and BMC flows through ports 44 of NIC 40 and the relevant sideband channel. In another embodiment, the functionality of control server 26 is executed by one of hosts 38 in a multi-host server such as server 24. In this embodiment, the control server can access the BMC associated with another host on the same server via the NIC and the relevant sideband channel, without passing through any of ports 44.

To communicate with a remote node 24, control server sends and receives, via switches 36 of network 32, management messages that create network management traffic. Management traffic sent by control server 26 may arrive at PORT1, PORT2, or both. Management traffic sent by BMCs 48 or common BMC 56 is typically delivered through one of the ports to the network, and via switches 36 to control server 26. In some embodiments, the control functionalities that are carried out by control server 26 can be implemented on one or more servers 24.

BMC 48 receives management instructions from control server 26 and executes them accordingly. For example, BMC 48 may receive from control server 26, management instructions to measure the temperature in the chassis of server 24 or internally in host 38 and send the measured temperature back to control server 26. Additionally, BMC 48 may be configured to monitor various activities that server 24, respective host 38 or both carry out during their operation, and to send monitoring reports or certain alerts when failure events occur, to control server 26.

In some embodiments, common BMC 56 executes monitor and control tasks that are related to the server as a whole (rather than per host). For example, common BMC 56 can be configured to monitor and control operational attributes of server 24 such as, for example, chassis temperature, power supply, cooling fans and the like, instead of, or in addition to BMCs 48.

In some embodiments, each of BMCs 48 and common BMC accesses network 32 via network adapter 40 using a dedicated bidirectional sideband channel (denoted SIDE-BAND in the figure). Although in server 24 of FIG. 1, common BMC 56 uses the same sideband channel as BMCs 48, in alternative embodiments, common BMC 56 may use a sideband channel that is separate from the sideband channel (or channels) used by BMCs 48. In some embodiments, each of the BMCs 48 and/or common BMC 56 connects to the network adapter using a separate sideband channel. Alternatively, multiple BMCs 48 and possibly common BMC 56 may connect to the network adapter using a shared sideband channel.

The sideband channel may comprise any suitable buses, interfaces, and protocols. For example, in some embodiments the sideband channel comprises the Management Component Transport Protocol (MCTP) and Network Controller Sideband Interface (NC-SI), over the System Management Bus (SMBus). Alternatively, the sideband channel comprises a Reduced Media Independent Interface (RMII) Based Transport (RBT) protocol over a RMII interface or Intel's Total Cost of Ownership (TCO) protocol over SMBus. TCO is a physical protocol over SMBus, which is supported by Intel devices such as I210, I350, 82599, 82574, x540 and XL710.

Additionally, in some embodiments the sideband or management channel comprises the NC-SI over MCTP over the Peripheral Component Interface Express Bus (PCIe), thus sharing a common physical bus with host 38 (not shown). In some embodiments, BMC 48 and common BMC 56 may use one of a plurality of management channels as defined in MCTP and/or RBT as defined in NC-SI.

Any suitable binding method can be used among the above mentioned protocols and underlying physical layer interfaces. Example combinations include NC-SI over RBT, NC-SI over MCTP over PCIe, NC-SI over MCTP over SMBus and TCO over SMBus.

The MTCP and NC-SI specifications are described, for example, in the Distributed Management Task Force (DMTF) standards "Management Component Transport Protocol (MCTP) Base Specification," Document Number: DSP0236, Jan. 24, 2013, version 1.2.0, and "Network Controller Sideband Interface (NC-SI) Specification," Document Number: DSP0222, Jan. 24, 2013, version 1.0.1, and "NC-SI over MCTP Binding Specification," Document Number: DSP0261, Aug. 22, 2013, version 1.0.0, which are all incorporated herein by reference.

The SMBus specifications are described, for example, in "System Management Bus (SMBus) Specification," Aug. 3, 2000, version 2.0, which is incorporated herein by reference. RBT is defined, for example, within the NC-SI specifications cited above. TCO is defined, for example, as part of the specifications of several Intel's devices such as the Intel's Ethernet controllers listed above.

Network adapter 40 handles bidirectional data and management traffic between switch 36 to which it connects, and hosts 38 and BMCs 48 and common BMC 56, respectively.

Server 24 may communicate data traffic with other servers or devices (e.g., such as servers 24) or control server 26. Network adapter 40 separates between traffic exchanged with different hosts 38 and between incoming management and data traffic, using predefined or configurable traffic filter(s) 71. Adapter 40 filters the incoming traffic, and directs data traffic arriving at PORT1 and PORT2 to network communication interfaces 70 (i.e., of the relevant host), denoted INT1 and INT2, respectively. The network adapter directs filtered management traffic to a respective BMC 48 of the relevant host or to common BMC 56.

Host 38 further comprises a boot over the network manager 82, and a wake over the network manager 86. Manager 82 may be implemented as a software client that host 38 executes to support the network boot functionality. Manager 86 is typically implemented as a combination of network adapter 40 and configuration software, to support the network wakeup functionality. Boot manager 82 enables a remote node to cause server 24 to re-boot, by loading boot management programs and related resources that are stored on other network servers.

Boot manager 82, may comprise, for example, the Preboot Execution Environment (PXE), which is described, for example, in "Preboot Execution Environment (PXE) Specification," Sep. 20, 1999, version 2.1, which is incorporated herein by reference. Wake over the network manager 86 may be implemented, for example, in combination of hardware and software, so as to recognize an incoming dedicated "magic packet" sent to wake the server up from a sleep or standby state. Manager 86 may comprise, for example, the Wake-On-Lan (WOL) protocol. Specifications for the magic packet are described, for example, in an AMD white-paper titled "Magic Packet Technology," publication number 20213, revision A, Amendment/0, November 1995, which is incorporated herein by reference.

The system configuration of FIG. 1, including the server, host, and network adapter configurations, are exemplary configurations, which are shown purely for the sake of conceptual clarity. Any other suitable system, server, host and/or network adapter configuration can also be used. Elements that are not necessary for understanding the principles of the disclosed embodiments, such as various interfaces, addressing circuits, timing and sequencing circuits and debugging circuits, have been omitted from the figure for clarity.

In the exemplary configuration shown in FIG. 1, network adapter 40, BMCs 48 and common BMC 56 are implemented as boards or Integrated Circuits (ICs) that are separated from the hardware of the server. In alternative embodiments, however, network adapter 40, BMCs 48 and/or common BMC 56 may be integrated with the server hardware, for example, on the mother board of the server, and may be interconnected by internal buses. Further alternatively, some or all of the functionality of network adapter 40 can be implemented in software and carried out by one or more CPUs 52 of hosts 38, or other processor in the server.

In some embodiments, CPU 52 and BMC 48 in host 38 are integrated into one hardware device.

In some embodiments, multiple CPUs 52 and/or multiple BMCs 48 and/or common BMC 56 in multi-host server 24 are integrated into one hardware device, and may be interconnected by internal buses.

In some embodiments, CPU 52, BMC 48, and/or common BMC 56 comprise one or more processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

The different elements of network adapter 40 may be implemented using any suitable hardware, such as in an Application-Specific Integrated Circuit (ASIC) or Field-Programmable Gate Array (FPGA). In some embodiments, some elements of network adapter 40 can be implemented using software, or using a combination of hardware and software elements.

Figure 2:
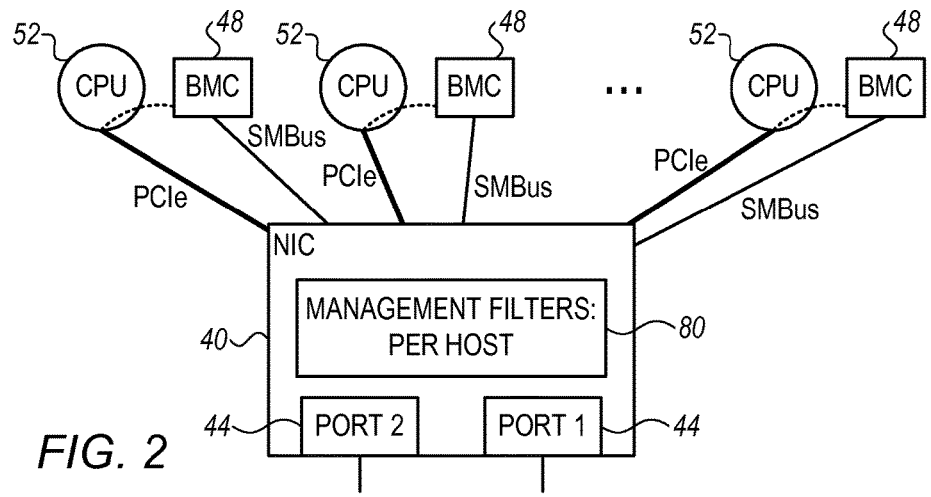
FIG. 2 is a diagram that schematically illustrates a Network Interface Controller (NIC) connected to multiple host CPUs and respective BMC units, in accordance with an embodiment that is described herein.

FIG. 2 is a diagram that schematically illustrates a Network Interface Controller (NIC) 40, which is connected to multiple host CPUs 52, and respective BMC units 48, in accordance with an embodiment that is described herein. NIC 40 can be used to implement the network interface of multi-host server 24 described above in FIG. 1.

In FIG. 2, each of the multiple CPUs connects to NIC 40 over a dedicated PCIe bus that is independent of the PCIe buses of the other CPUs, and each of the multiple hosts has a dedicated BMC controlling it. Each BMC 48 may connect to NIC 40 over a dedicated SMBus or over PCIe, using a path from the BMC to the host PCIe bus existing in the host CPU. NIC 40 may switch between several supported connection types to a given BMC, on the fly, based on any suitable criterion. For example, when a given host is in a low power or standby state, the PCIe bus may become non-functional and therefore the NIC connects to the respective BMC over the SMBus. When the host recovers to operative state, the NIC may switch to connect via the PCIe, which is typically faster than the SMBus. By using this sideband channel switching feature, NIC 40 can exchange management traffic with the BMCs regardless of the power state of their corresponding hosts.

The NIC in FIG. 2 includes dedicated filters 80 for each of the BMCs, allowing separate configuration of the management channel for each BMC. In an embodiment, filters 80 are configurable and implemented in hardware for minimal latency and maximal throughput. Filters 80 deliver incoming traffic to the relevant host, and additionally separate between data and management traffic. NIC 40 delivers incoming filtered data packets to the relevant host over the PCIe bus and management packets to the relevant BMC over the PCIe bus or over the SMBus.

Filters 80 can identify the host and BMC to which to direct the incoming traffic using various addressing configurations, possibly depending on the interfaces and protocols used. For example, the destination address may include an Internet Packet (IP) address and/or a Media Access Control (MAC address).

NIC 40 can identify the destination of a given BMC to which to send response messages to commands sent earlier from the given BMC, based on MCTP Endpoint ID (EID), BMC MAC address, source address on the bus on which the command was received and the interface from which the command was received.

Figure 3:
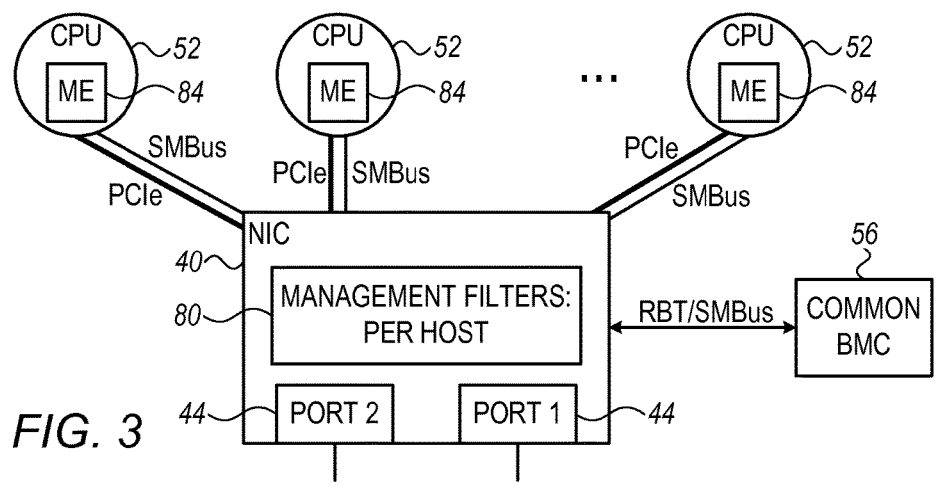
FIG. 3 is a diagram that schematically illustrates a NIC connected to multiple host CPUs, each using an embedded Management Engine (ME), in accordance with an embodiment that is described herein.

FIG. 3 illustrates a NIC which is connected to multiple host CPUs 52, each using an embedded Management Engine (ME) 84, in accordance with an embodiment that is described herein. In FIG. 3, each of the multiple CPUs connects to NIC 40 over a dedicated PCIe bus, and each of the multiple hosts has a dedicated ME controlling it. In some embodiments, when connecting multiple MEs to the same NIC 40, each of the multiple MEs can connect to NIC 40 over a dedicated SMBus or over a shared SMBus.

In some embodiments, ME 84 comprises a processor or coprocessor embedded in a chipset implementing CPU 52.

Typically, ME 84 and BMC 48 have similar functionalities. In some embodiments, ME 84 has respective IP and MAC addresses associated with the management sideband channel. Each ME may connect to the NIC over a dedicated SMBus or over PCIe, using a path from the ME to the host PCIe bus existing in the host CPU.

In some embodiments, an additional dedicated common BMC 56 is connected to the NIC. NIC 40 may connect to common BMC 56, for example, via SMBus or RBT. The additional common BMC may be used for chassis management of the server. The common BMC controls the shared resources which are used by multiple CPUs (or hosts) such as chassis temperature, power supply and cooling fans. The separation of the chassis management from the MEs allows having a symmetric system in which no specific CPU manages the resources which are shared with the other CPUs.

The NIC in FIG. 3 include a dedicated hardware filter for each of the MEs and an additional hardware filter for common BMC 56, allowing separate configuration of the management channel for each of the MEs and the common BMC. Each of the MEs can use either SMBus sideband interface or the PCIe interface using the CPU PCIe connection. Each of the MEs may change the interface in use between SMBus and PCIe per its own decision.

In some embodiments, instead of using separate SMBus connections between NIC 40 and MEs 84, common BMC 56 handles these separate SMBus connections to the MEs instead of NIC 40 (not shown). In such embodiments, common BMC 56 functions as a SMBus distributer. Common BMC 56 thus serves as a SMBus owner, which simplifies SMBus enumeration, for example, when installing a new host or removing an existing host.

For minimal system connectivity, it may be desirable to minimize the number of hardware connections from NIC 40 to the other elements of multi-host server 24. In some embodiments, multiple BMCs connect to the NIC over the same shared bus.

Figure 4:
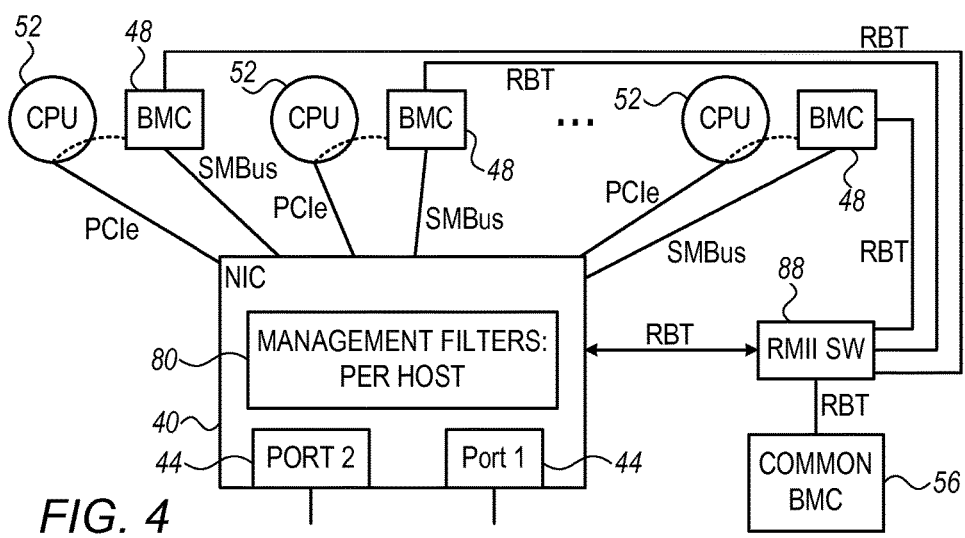
FIG. 4 is a diagram that schematically illustrates multiple BMC units sharing a common RBT interface using a Reduced Media Independent Interface (RMII) switch, in accordance with an embodiment that is described herein.

FIG. 4 is a diagram that schematically illustrates multiple BMC units sharing a common RBT interface using a Reduced Media Independent Interface (RMII) switch, in accordance with an embodiment that is described herein. The RMII switch functions as a sideband channel distribution switch. The BMCs connecting via RBT include BMCs 48 and common BMC 56. In this configuration, a common RBT sideband interface is used to connect to all (or some) of the BMCs, thus minimizing the number of required sideband interfaces. Each of the BMCs can use either RBT sideband interface or the PCIe interface using the CPU PCIe connection. Each of the BMCs may change the interface in use between RBT and PCIe per its own decision. In some embodiments, one or more of BMCs 48 may connect to NIC 40 via SMBus instead of RBT.

Figure 5:
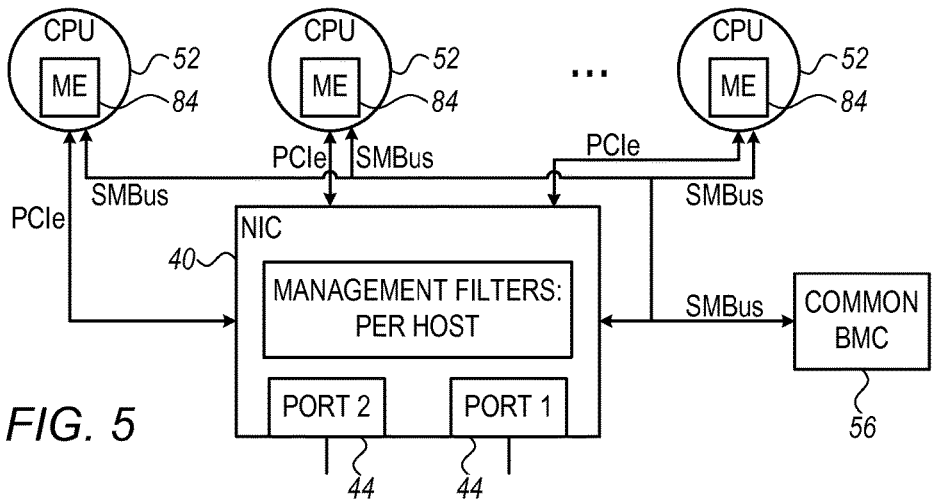
FIG. 5 is diagram that schematically illustrates another example of sharing a common sideband interface bus, in accordance with an embodiment that is described herein.

FIG. 5 is a diagram that schematically illustrates another example of sharing a common sideband interface bus, in accordance with an embodiment that is described herein. FIG. 5 shows a shared SMBus which is used to connect multiple MEs and common BMC 56 to the NIC. In this example, each ME connects to a different SMBus address in the NIC. Each ME uses a dedicated management channel, based on the SMBus address to which the ME connects. In some embodiments, similar connection scheme applies with BMCs 48 replacing MEs 84.

To share a common SMBus by multiple MEs or BMCs, the SMBus interface in the NIC is configured as multiple separate SMBus interfaces, each assigned to a different SMBus address. The SMBus interfaces share the same package signals. Alternatively, the NIC comprises a single SMBus interface that supports multiple SMBus addresses.

Figure 6:
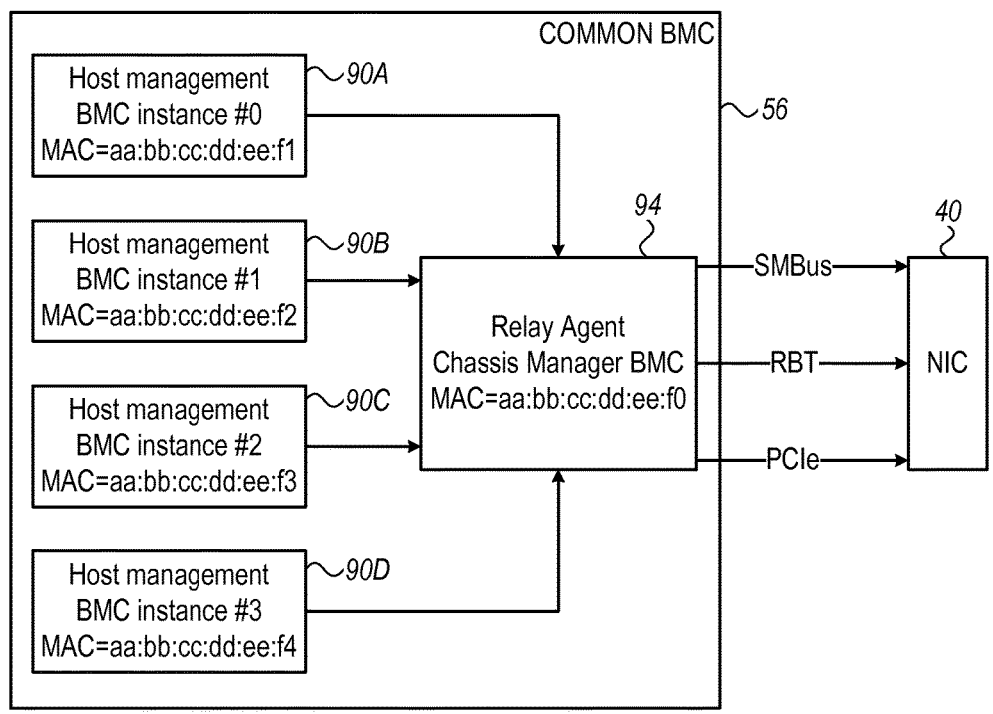
FIG. 6 is a diagram that schematically illustrates a common BMC that executes multiple BMC instances, in accordance with an embodiment that is described herein.

FIG. 6 is a diagram that schematically illustrates a common BMC 56 that executes multiple BMC instances, in accordance with an embodiment that is described herein. Common BMC 56 of FIG. 6 can be used in implementing common BMC 56 of FIG. 1 above.

Common BMC 56 is configured to execute multiple BMC instances 90, each associated with a different host 38 and a different MAC address. The functionality of BMC instance 90 is typically similar to the functionality of BMC 48 or ME 84. A relay agent 94 is assigned a MAC address, which is different from the MAC addresses of BMC instances 90. Relay agent 94 can connect to NIC 40 via any suitable sideband channel, such as SMBus, RBT or PCIe. Additionally, NIC 40 may select the interface used for connecting with relay agent 94 on the fly. Based on the different MAC addresses associated with BMC instances 90, relay agent 94 handles separate management traffic channels with BMC instances 90.

The NIC and system configurations shown in FIGS. 2-6 are depicted purely by way of example. In alternative embodiments, any other suitable NIC or system configuration can be used. For example, in some embodiments, various elements described in FIGS. 2-6 can be combined in any suitable way. For example, in an embodiment, some CPUs have embedded MEs 84, whereas other CPUs are controlled using BMCs 48. In a given combination, common BMC 56 can be included, e.g., as a chassis manager, or otherwise excluded. When included, common BMC 56 can additionally execute one or more BMC instances 90 to manage and control respective one or more hosts 38. In an example embodiment, common BMC 56 may use multiple SMBus connections to enable each BMC instance 90 to connect separately over SMBus to NIC 40.

Although the disclosed embodiments refer mainly to a network adapter that exchanges simultaneously data and management packets with multiple hosts and respective BMCs in a multi-host server, this configuration is not mandatory and other suitable configurations can also be used. For example, a single network adapter in a given server may connect to at least one host and corresponding BMC that reside in another server.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network adapter, comprising:
   one or more ports, which are configured to connect to a switch in a communication network; and
   a predefined or configurable traffic filter, which is coupled to a network node in which the network adapter resides, the network node comprises multiple hosts, associated respectively with multiple Baseboard Management Controller (BMC) units, wherein each of the multiple hosts comprises a respective different CPU, and each of the multiple hosts is associated with a respective different BMC unit, wherein the traffic filter in the network adapter is configured to:

receive packets over the communication network via the one or more ports;

filter the received packets so as to identify, for each received packet (i) a respective host that the received packet is addressed to, and (ii) whether the received packet is a data packet addressed to the CPU of the identified host, or a management packet addressed to a BMC unit of the identified host; and forward the received packets to the addressed hosts and BMC units based on filtering of the packets.

2. The network adapter according to claim 1, wherein the traffic filter is configured to identify and exchange management packets between the BMC units and a control server external to the network node over the communication network via the one or more ports.

3. The network adapter according to claim 1, wherein a control server is implemented in a first host in the network node, and wherein the traffic filter is configured to identify and exchange management packets between the control server and a BMC unit of a second host of the network node directly, and not over the communication network.

4. The network adapter according to claim 1, wherein the traffic filter is configured to identify and exchange management packets with a given BMC unit over a dedicated sideband channel.

5. The network adapter according to claim 4, wherein the sideband channel comprises two or more channel types, and wherein the traffic filter is configured to select the sideband channel corresponding to one of the channel types during exchanging of the management packets.

6. The network adapter according to claim 1, wherein a given BMC unit, which is associated with a respective host, is embedded in a processor of the respective host, and wherein the traffic filter is configured to identify and exchange management packets both with the given BMC unit and with one or more BMC units other than the given BMC unit.

7. The network adapter according to claim 1, wherein the traffic filter is configured to identify and exchange, over a dedicated sideband channel, at least part of management packets that the traffic filter identifies with a common BMC unit that handles common resources of the network node.

8. The network adapter according to claim 1, wherein the traffic filter is configured to identify and exchange management packets with the BMC units by configuring a distribution switch to handle dedicated sideband channels for the respective BMC units, and exchanging the management packets indirectly via the distribution switch.

9. The network adapter according to claim 1, wherein the traffic filter is configured to identify and exchange management packets with multiple BMC units over a shared sideband channel.

10. The network adapter according to claim 9, wherein the shared sideband channel comprises multiple sideband connections, each comprising a respective different connection address to which the respective BMC unit connects.

11. The network adapter according to claim 9, wherein the shared sideband channel comprises a single sideband connection supporting multiple connection addresses for connecting to the respective BMC units.

12. The network adapter according to claim 1, wherein one or more of the multiple BMC units comprise respective BMC instances that are executed by a common BMC unit, and wherein the traffic filter is configured to identify and exchange management packets with the BMC instances of the common BMC unit.

13. A method for remote management, comprising:

in a network node that comprises a Network Interface Controller (NIC) that comprises one or more ports for connecting to a communication network, and multiple hosts, associated respectively with multiple Baseboard Management Controller (BMC) units, wherein each of the multiple hosts comprises a CPU, and each of the multiple hosts is associated with a respective different BMC unit, receiving by the NIC packets over the communication network via the one or more ports;

filtering the received packets, using a predefined or configurable traffic filter of the NIC, so as to identify, for each received packet (i) a respective host that the received packet is addressed to, and (ii) whether the received packet is a data packet addressed to the CPU of the identified host, or a management packet addressed to a BMC unit of the identified host; and forwarding the received packets to the addressed hosts and BMC units based on filtering of the packets.

14. The method according to claim 13, and comprising identifying and exchanging by the traffic filter of the NIC management packets between the BMC units and a control server external to the network node over the communication network via the one or more ports.

15. The network adapter according to claim 13, wherein a control server is implemented in a first host in the network node, and comprising identifying and exchanging by the traffic filter of the NIC management packets between the control server and a BMC unit of a second host of the network node directly, and not over the communication network.

16. The method according to claim 13, and comprising identifying and exchanging by the traffic filter management packets with a given BMC unit over a dedicated sideband channel.

17. The method according to claim 16, wherein the sideband channel comprises two or more channel types, and wherein identifying and exchanging the management packets comprises selecting the sideband channel corresponding to one of the channel types during exchanging of the management packets.

18. The method according to claim 13, wherein a given BMC unit, which is associated with a respective host, is embedded in a processor of the respective host, and comprising identifying and exchanging by the traffic filter management packets both with the given BMC unit and with one or more BMC units other than the given BMC unit.

19. The method according to claim 13, and comprising identifying and exchanging by the traffic filter, over a dedicated sideband channel, at least part of management packets that the traffic filter exchanges with a common BMC unit that handles common resources of the network node.

20. The method according to claim 13, and comprising configuring a distribution switch to handle dedicated sideband channels for the respective BMC units, and identifying and exchanging by the traffic filter management packets indirectly via the distribution switch.

21. The method according to claim 13, and comprising identifying and exchanging by the traffic filter management packets with multiple BMC units over a shared sideband channel.

22. The method according to claim 21, wherein the shared sideband channel comprises multiple sideband connections, each comprising a respective different connection address to which the respective BMC unit connects.

23. The method according to claim 21, wherein the shared sideband channel comprises a single sideband connection supporting multiple connection addresses for connecting to the respective BMC units.

24. The method according to claim 13, wherein one or more of the multiple BMC units comprise respective BMC instances that are executed by a common BMC unit, and comprising identifying and exchanging by the traffic filter management packets with the BMC instances of the common BMC unit.

25. A network node, comprising:

multiple hosts, associated respectively with multiple Baseboard Management Controller (BMC) units, wherein each of the multiple hosts comprises a CPU, and each of the multiple hosts is associated with a respective different BMC unit; and a network adapter comprising one or more ports for connecting to a communication network and a predefined or configurable traffic filter, wherein the network adapter is configured to:

receive packets over the communication network via the one or more ports;

filter the received packets using the traffic filter so as to identify, for each received packet (i) a respective host that the received packet is addressed to, and (ii) whether the received packet is a data packet addressed to the CPU of the identified host, or a management packet addressed to a BMC unit of the identified host; and forward the received packets to the addressed hosts and BMC units based on filtering of the packets.

* * * * *